United States Patent [19]

Green et al.

[11] Patent Number: 4,927,238
[45] Date of Patent: May 22, 1990

[54] METHOD AND APPARATUS FOR DISPLAYING A THREE DIMENSIONAL VISUAL IMAGE

[75] Inventors: James A. Green, Mars, Pa.; Nicholas C. Terzis, 1507 Merrick Ave., Pittsburgh, Pa. 15226

[73] Assignee: Nicholas C. Terzis, Pittsburgh, Pa.

[21] Appl. No.: 253,315

[22] Filed: Sep. 30, 1988

Related U.S. Application Data

[63] Continuation of Ser. No. 675,275, Nov. 27, 1984, abandoned.

[51] Int. Cl.$^5$ .................... G02B 27/22; G03B 21/32
[52] U.S. Cl. .................................. 350/130; 350/133; 350/144; 352/86; 353/7; 353/10
[58] Field of Search ................... 350/130, 133, 144; 352/86; 353/7, 10

[56] References Cited

U.S. PATENT DOCUMENTS

| | | | |
|---|---|---|---|
| 1,882,424 | 10/1932 | Ives | 353/7 |
| 2,184,641 | 12/1939 | Glanz | 353/7 |
| 2,313,947 | 3/1943 | Klinkum | 350/131 |
| 2,514,814 | 7/1950 | Towne | 350/131 |
| 2,679,188 | 5/1954 | Gould | 350/144 |
| 3,101,644 | 8/1963 | Lopez-Henriquez | 350/144 X |
| 4,158,481 | 6/1979 | Hoyer | 350/144 |
| 4,304,477 | 12/1981 | Green | 354/112 |
| 4,481,050 | 11/1984 | Gundlach et al. | 156/58 |
| 4,557,954 | 12/1985 | Gundlach et al. | 428/29 |

Primary Examiner—Scott J. Sugarman

[57] ABSTRACT

A photographic display for depicting a three dimensional visual image including a supporting frame for displaying a photographic image including a height, width and a predetermined thickness. A viewing screen is provided and disposed to extend substantially along the height and width of said supporting frame and being positioned on a first side thereof. The viewing screen includes a plurality of substantially parallel lines having a predetermined width and being separated by clear spaces. A photographic image is provided and disposed to extend substantially along the height and width of said supporting frame and being positioned on a second side thereof, spaced from said first side by said predetermined thickness of the supporting frame. The photogrpahic image includes a plurality of substantially parallel image segments having a predetermined width corresponding to the width of the lines positioned on the viewing screen and the lines positioned on the photographic images are in alignment and registration with the lines positioned on the viewing screen. The predetermined thickness spacing the photographic image from the viewing screen reveals a three dimensional visual image of the photographic image when viewing the photographic image through the viewing screen. Ambient air is positioned in the space between the viewing screen and the photographic image.

17 Claims, 3 Drawing Sheets

METHOD AND APPARATUS FOR DISPLAYING A THREE DIMENSIONAL VISUAL IMAGE

This is a continuation of application Ser. No. 06/675,275 filed on November 27, 1984 now abandoned.

BACKGROUND OF THE INVENTION

1. Field of the Invention

The present invention is directed to a method and apparatus for displaying a three dimensional visual image.

2. Description of Background Art

It is customary in displaying an advertisement to depict the advertisement in a two dimensional light frame box. The two dimensional picture displays advertising indicia to entice a potential customer into purchasing a particular product.

Displaying a three dimensional photograph has been extremely difficult. The ability to mass produce a three dimensional photographic image for displaying in a lighted box has hithertofore been impractical. The present invention overcomes deficiencies in the prior art by permitting the display of a three dimensional photographic image for enticing a consumer to purchase a particular product.

SUMMARY AND OBJECTS OF THE INVENTION

It is an object of the present invention to provide a photographic display for depicting a three dimensional visual image.

A further object of the present invention is to provide a photographic display which may be constructed of either a flexible material, a semi-rigid material or a rigid material.

A still further object of the present invention is to provide a photographic display which may be enlarged for displaying a three dimensional image.

Another object of the present invention is to maintain a viewing screen in a substantially parallel relationship with respect to a photographic image so as to display a three dimensional visual image.

A further object of the present invention is to eliminate the need for heavy, bulky, costly glass or plastic lenticular viewing screen configurations which have hithertofore been necessary.

A still further object of the present invention is to provide a multidimensional photographic display which may be reproduced by photographically reproducing a Kodak Duratrans enlarged photograph which is used as the photographic image in the three dimensional display.

Another object of the present invention is to provide a photographic display which is capable of being reproduced by a printing plate using a clear polycarbonate film or other clear film compatible with proper inks whereby a lithograph of the exact image is positioned thereon.

A still further object of the present invention is to provide a photographic display which may be reproduced by utilizing a silk screen or by utilizing a drum roller shaped plate to position a linear pattern on any suitable clear material for displaying the three dimensional visual image.

These and other objects of the present invention are achieved by providing a supporting frame for displaying a multidimensional photographic image which includes a height, width and a predetermined thickness. A viewing screen is positioned on one side of the supporting frame and extends substantially along the height and width thereof. The viewing screen includes a plurality of substantially parallel lines having a predetermined width and being separated by clear spaces. A photographic image is positioned to extend along the height and width of the supporting frame and is disposed on a second surface thereof. The viewing screen is spaced from the photographic image by the predetermined thickness of the supporting frame. The photographic image includes a plurality of substantially parallel image segments having a predetermined width corresponding to the width of the lines positioned on the viewing screen and being in alignment and registration with the lines positioned on the viewing screen. The predetermined thickness of the supporting frame spaces the viewing screen from the photographic image to reveal a three dimensional visual image of the photographic image when viewing the photographic image through the viewing screen.

Further objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
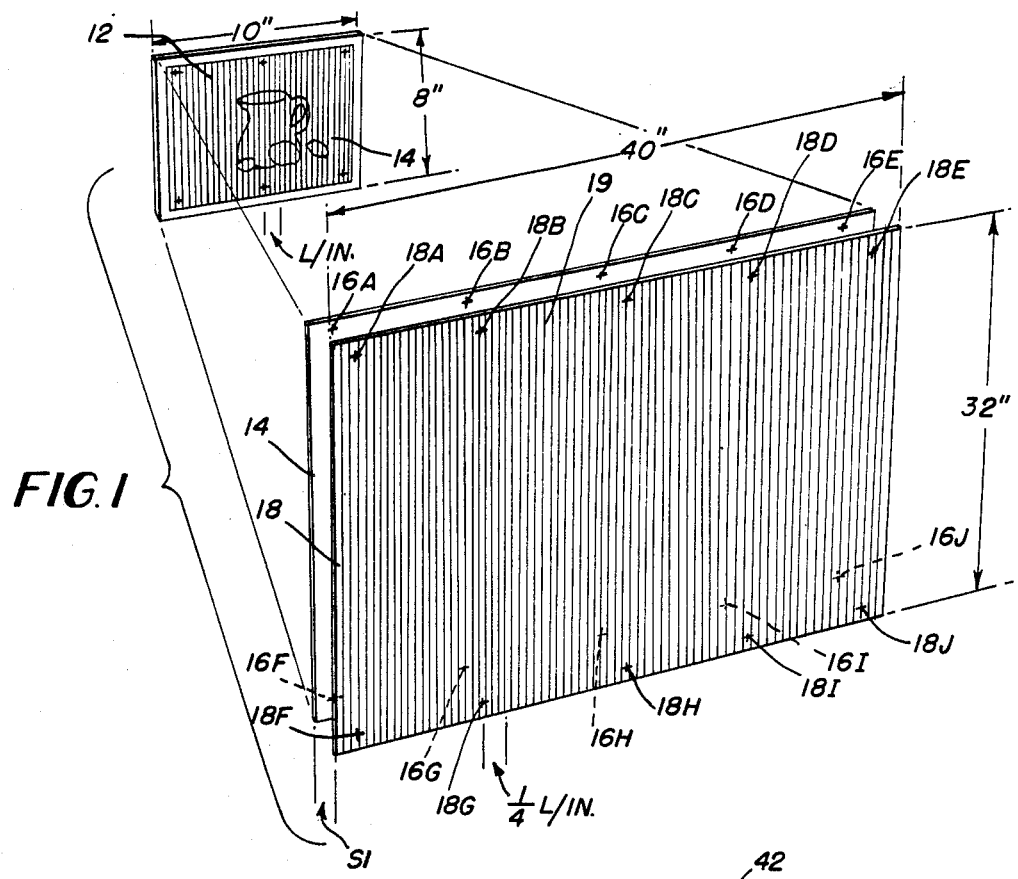
FIG. 1 is a perspective view illustrating a photographic image being enlarged to a predetermined extent with a viewing screen spaced a predetermined distance from the photographic image.
Figure 2:
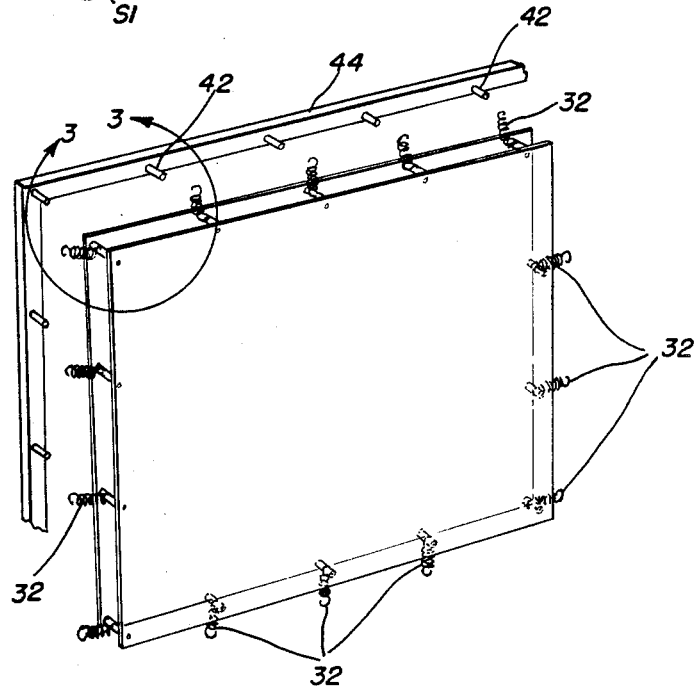
FIG. 2 is a perspective view illustrating an arrangement of the viewing screen relative to the photographic image to maintain the viewing screen and the photographic image in a substantially parallel and registered arrangement.
Figure 3:
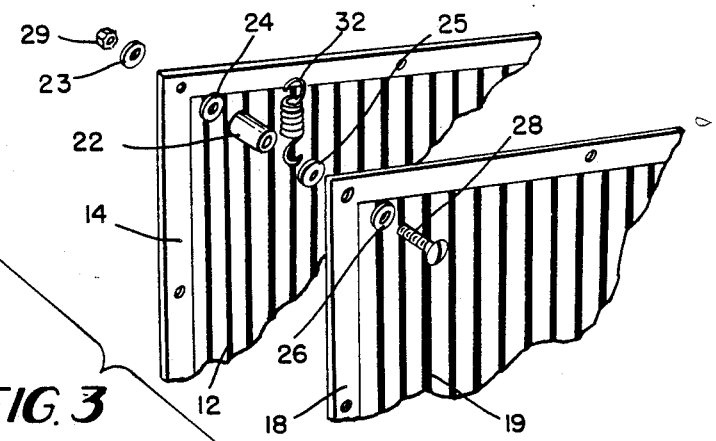
FIG. 3 is an enlarged view of a section of the present invention as illustrated in FIG. 2.

As illustrated in FIGS. 1-3, the present invention begins with a photograph which may be in the size of 4 inches by 5 inches, 5 inches by 7 inches, 8 inches by 10 inches, 11 inches by 14 inches or any other size of existing large film format. The photograph is positioned on a flexible film and is produced by any one of a number of still cameras capable of applying a series of substantially parallel image segments onto the surface of the photograph by way of a lenticular line screen. The series of substantially parallel image segments 12 positioned on the photograph 14 are arranged to have a predetermined width based on the lenticular line screen used in the type cameras aforementioned. A certain number of lines per linear inch are originally set forth on the film which may be 8 inches by 10 inches, as illustrated in FIG. 1.

The photographic image 14 may be enlarged to any desired size. As illustrated in FIG. 1, a 400 percent enlargement renders an 8 inch by 10 inch photograph into a photograph which is 32 inches by 40 inches. The number of substantially parallel lines 12 appearing in the original photographic image 14 is decreased so that one-fourth of the number of lines are set forth in the enlarged print per linear inch. Registration marks 16A-16J are transposed to appear on the enlarged photographic image. A viewing screen 18 is made of a clear material having a plurality of substantially parallel lines 19 being disposed thereon. The substantially parallel lines 19 are separted by clear spaces along the length of the viewing screen. The lines 19 and the lines 12 are of the same thickness and are spaced apart by the same distance. The viewing screen 18 includes a plurality of registration marks 18A-18J disposed on the surface thereof.

As illustrated in FIGS. 1-3, the viewing screen 18 must be aligned and in proper registration with the photographic image 14. The plurality of substantially parallel lines 19 positioned on the viewing screen 18 must be aligned and in proper registration with the substantially parallel image segments 12 appearing on the photographic image 14. In addition, the viewing screen 18 must be in a substantially parallel relationship with the photographic image 14.

To position the viewing screen 18 to be substantially parallel with the photographic image 14 and to be properly spaced a predetermined distance therebetween, a first supporting frame structure is set forth in FIGS. 2 and 3. A spacer 22 is provided to extend between the viewing screen 18 and the photographic image 14. A bolt 28 is positioned to be received between washers 23-26 and is secured by means of a nut 29. The spacer 22 is positioned around the bolt 28 and serves to define the specific distance necessary between the viewing screen 18 and the photographic image 14. A spring 32 is utilized to secure the viewing screen 18 and the photographic image 14 to a peg 42 positioned on an outer frame 44. A plurality of pegs are disposed around the outer frame 44 and are engaged by a plurality of springs to stretch the flexible viewing screen 18 and the photographic image 14 so as to be in a substantially taut position and to ensure a fixed and substantially parallel relationship between the viewing screen 18 and the photographic image 14. Only ambient air is positioned in the space between the viewing screen and the photographic image.

The registration marks 16A-16J positioned on the photographic image 14 are utilized to align the viewing screen 18 by positioning the registration marks 18A-18J to be aligned relative therewith. In this manner, the plurality of substantially parallel lines appearing on the viewing screen 18 are adequately aligned and in registration with the plurality of substantially parallel lines 12 appearing on the photographic image 14.

The space S1 positioned between the viewing screen 18 and the photographic image 14 is determined mathematically. The thickness of the taking screen lens in the camera which includes a series of substantially parallel lenticular lines is one variable in the formula for determining the spacing between the viewing screen 18 and the photographic image 14. The second variable is the enlargement ratio between the original photographic image depicted on a photographic film and the enlarged photographic image depicted on the enlarged sheet. For example, the embodiment illustrated in FIG. 1 is a 400 percent enlargement which would be an enlargement ratio of 1:4. The enlargement ratio 1:4 is multiplied times the thickness of the original lenticular taking screen of the camera. Thus, the spacing S1 is determined by multiplying the number four (4) times the thickness of the original taking screen.

The original lenticular taking screen in a camera which is utilized to print a film negative by exposing the lenticular screen onto a light sensitive, ortho type (Kodalith) film is extremely important in depicting a three dimensional image. A series of substantially parallel lines which are separated by clear spaces are depicted onto the photographic image disposed on the film. As previously discussed, initially the number of lines 12 disposed along a linear inch of the photographic image will be a certain value. The three factors, namely, the lines 12, the clear spaces between the lines 12 and the thickness of the original taking screen must remain constant throughout the enlarging process to depict a successful three dimensional image. By maintaining the variables in a constant relationship, the enlarged image may be perceived as a three dimensional image. Thus, the space S1 must be maintained as being equal to the enlargement ratio multiplied times the thickness of the original taking screen to result in a perception of a three dimensional image.

The viewing screen 18 and the photographic image 14 must also be arranged in a substantially parallel relationship in order to trick a viewer's eye into seeing a multidimensional image in the enlarged size. The enlarged linear pattern of substantially parallel lines 19 must line up substantially parallel with the image segments 12 of the enlarged photo 14 to display a multidimensional image.

Figure 4:
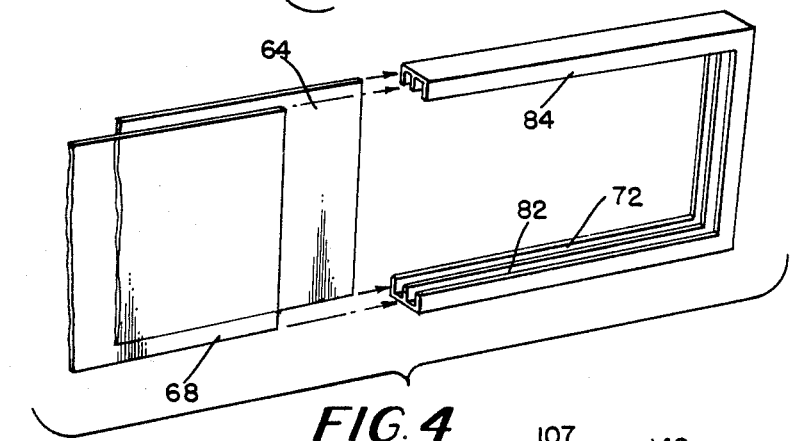
FIG. 4 is a partially cutaway view illustrating the viewing screen and the photographic image being disengaged from a rigid support frame.

FIG. 4 illustrates another embodiment of the present invention wherein the photographic image 64 is positioned on a semi-rigid material. The viewing screen 68 is also constructed of a semi-rigid material. The photographic image 64 and the viewing screen 68 are positioned within slots 72, 82 disposed within the outer frame 84. The outer frame 84 is a rigid support frame having the slots 72, 82 disposed around and spaced a predetermined distance with respect to each other within the inner peripheral surface of the outer frame 84. The photographic image 64 is thereby spaced the required predetermined distance from the viewing screen 68 so as to display a three dimensional visual image. The distance between the slots 72, 82 is determined in the same manner as the distance S1 is determined with respect to the embodiment illustrated in FIGS. 1-3.

Figure 5:
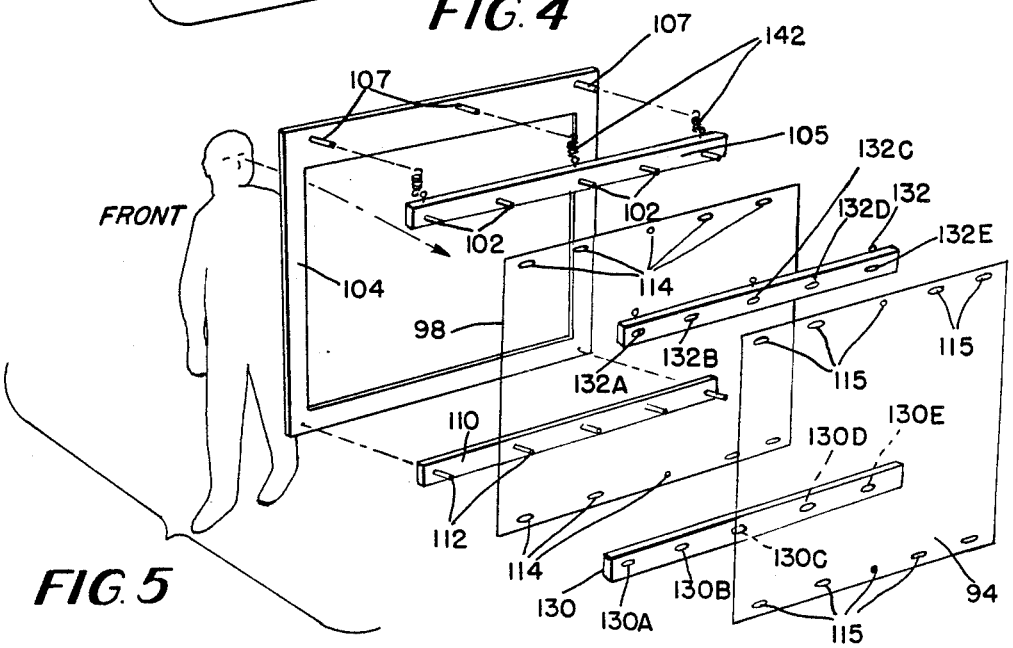
FIG. 5 is an exploded view illustrating another embodiment of the present invention wherein the viewing screen and the photographic image are positioned on a support frame.

FIG. 5 shows another embodiment of the present invention wherein the photographic image 94 and the viewing screen 98 are positioned on a support frame 104. The support frame 104 includes a tension applying spacer 105 including a plurality of pegs 102 disposed along the length thereof. In addition, pegs 107 are disposed along the upper surface of the outer frame 104. A plurality of springs 142 connect the spacer 105 to the outer frame 104. In addition, a fixed supporting frame 110 is mounted to the lower end of the outer frame 104. The fixed support frame 110 includes a plurality of pegs 112 disposed along the length thereof.

The viewing screen 98 includes a plurality of apertures 114 positioned along the length dimension thereof. The apertures 114 are designed to mate with the pegs 102, 112 to secure the viewing screen 98 to the outer frame 104. The springs 142 apply tension to the viewing screen 98 to hold the viewing screen in a fixed orientation relative to the outer frame 104.

An additional spacing bar 130 includes a plurality of apertures 130A-130E disposed along the length thereof. In addition, a spacer bar 132 is provided with a plurality of apertures 132A-132E disposed along the length thereof. The spacer bars 130, 132 are designed to be positioned on the pegs 102, 112 of the frame members 105, 110, respectively. The photographic image 94 includes a plurality of slots 115 disposed along the length thereof which mate with the pegs 102, 112. In this manner, the photographic image 94 may be retained in a tensioned and secure manner relative to the outer frame 104.

Figure 6:
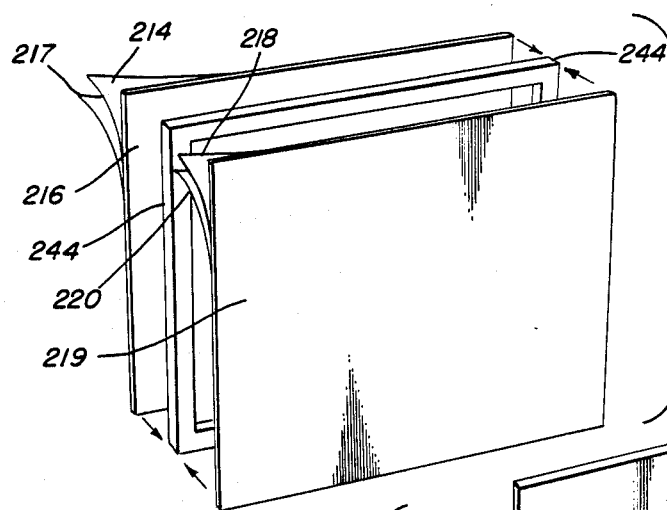
FIG. 6 is an embodiment of the present invention wherein the viewing screen and the photographic image are positioned on rigid material and disposed on each side of a support frame.

FIG. 6 illustrates an embodiment of the present invention wherein the photographic image 214 is mounted on a rigid, clear sheet 216. A laminated material 217 may be positioned over the photographic image 214. In addition, the viewing screen 218 is positioned on a rigid, clear sheet 219. A laminated layer 220 may be positioned over the photographic image 218. A frame member 244 is positioned between the sheets 216 and 219. The frame member 244 is of a predetermined thickness for spacing the viewing screen 218 a predetermined distance away from the photographic image 214. The plurality of substantially parallel lines disposed on the viewing screen 218 must be in proper alignment and registration with the plurality of substantially parallel lines disposed on the photographic image 214.

Figure 7:
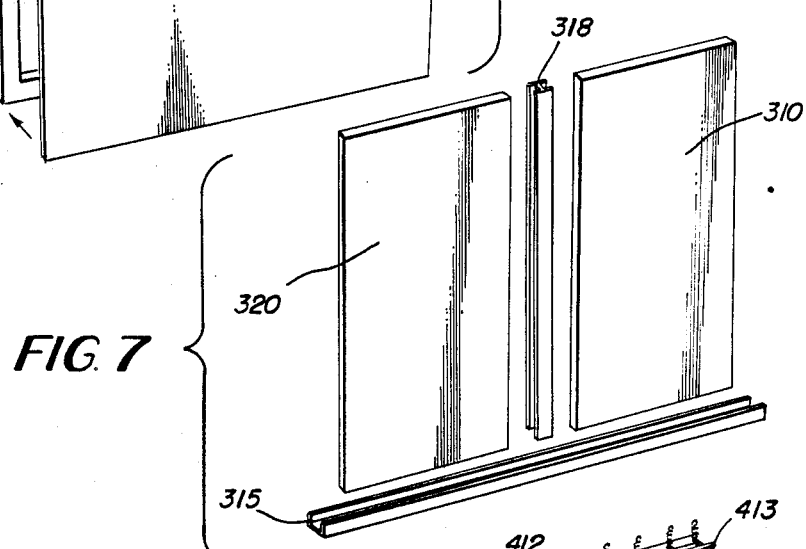
FIG. 7 is a perspective view illustrating two rigid photographic images positioned relative to viewing screens which may be combined adjacent to each other so as to depict a billboard.

FIG. 7 is a perspective view illustrating two photographic units 310, 320 being positioned relative to each other. A support and alignment member 315 secures the lower edge of the photographic units. A mullion 318 is utilized to secure the height dimension of the photographic units. The photographic units 310, 320 may be constructed in the same manner as the photographic unit illustrated in FIG. 6. By positioning a plurality of photographic units 310, 320 in alignment with respect to each other, an enlarged image may be displayed which depicts a three dimensional visual image. In this manner, a billboard size three dimensional visual image may be depicted.

Figure 8:
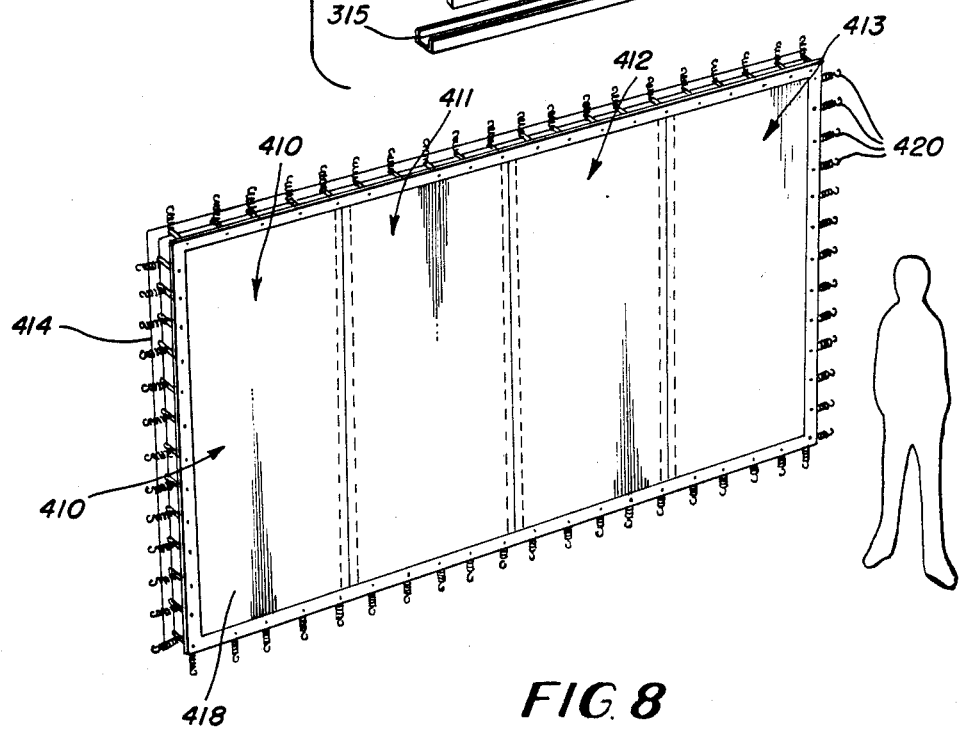
FIG. 8 is a perspective view illustrating the display device set forth in FIG. 2 being combined in a side-by-side arrangement to project the image of a billboard.

FIG. 8 illustrates an embodiment of the present invention wherein a plurality of the flexible viewing screens 18 and the photographic images 14 may be positioned in a side-by-side arrangement. A plurality of flexible photographic units 410, 411, 412 and 413 are arranged in a side-by-side manner. A plurality of spacers are utilized to space the viewing screen 418 from the photographic image 414. In addition, a plurality of springs 420 are provided for mounting the units 410, 413 onto an enlarged outer frame, not illustrated, to retain the viewing screen 418 in a substantially parallel relationship with respect to the photographic image 414.

According to the present invention, a taking screen in a camera may include a lenticular screen which is used as a master in the optical slide making technique. This technique includes a series of registration markings on the taking screen. The same camera containing the taking screen may be utilized to photograph the image which is desired to be viewed in a three dimensional manner. In addition, the same camera with the same taking screen may be used to make a film having a plurality of substantially parallel lines and clear spaces positioned thereon which is utilized in making the viewing screen. Thus, any original photograph which is enlarged in the exact mathematical ratio with the film forming the taking screen will have the exact registration markings positioned on both the enlarged photographic image and on the enlarged taking screen. The registration markings assist in properly aligning the plurality of substantially parallel lines disposed on both the viewing screen and on the photographic image.

There are a number of various ways in which to enlarge both the photographic image and the viewing screen. More specifically, the photographic image and the viewing screen may be enlarged photographically by reproducing a Kodalith or enlarged format image. This enlarged photographic image and Kodalith viewing screen may be positioned in a side-by-side relationship so as to depict a three dimensional image. In addition, a printing plate may be utilized to reproduce the plurality of substantially parallel lines on a clear polycarbonate film or other compatible clear film utilizing proper inks. A lithographic technique may be incorporated to reproduce the exact image in any desired quantity. This technique can be done with construction of sufficient strength and durability to directly withstand outdoor weather conditions.

A third technique utilized to enlarge the viewing screen may incorporate a silk-screening procedure. The fabric on which the enlargement is to be positioned is stretched with the grain running at an acute angle with respect to the linear pattern of substantially parallel lines which are desired to be positioned on the enlarged photographic image and the enlarged viewing screen. This technique avoids a moire pattern which will have a negative effect on the reproduced image. The desired number of reproductions may be thereafter reproduced by utilizing the same silk screen technique. A fourth procedure in which to enlarge the viewing screen may incorporate a drum roller shaped plate with the linear pattern of substantially parallel lines being disposed thereon. The lines are applied in the exact mathematical ratio and printed in a continuous pattern on any suitable clear material utilizing compatible inks.

The original photographic image may be enlarged onto a transparency film with a built-in diffuser (such as Kodak's Duratrans). This technique utilizing a transparency with a built-in diffuser can eliminate heavy, costly and light reducing materials. In addition, offset printing may be incorporated into the enlargement process wherein both sides of the plastic diffuser material will include printing thereon. More specifically, a standard lithographic color separation is made into two sets, one right reading and the second, wrong reading. The right reading print is positioned on a first side of the plastic material. The wrong reading print is positioned on a second side of the plastic material in tight registration. In this manner, both sides of the plastic material are impinged with the same image. Sufficient color saturation can be achieved in this manner to give the illusion of a photographic reproduction while utilizing offset printing.

All of the enlarged format three dimensional transparency configurations discussed hereinabove are designed to be incorporated into a rear illuminated viewing box. Typical incandescent, fluorescent or other light fixtures are positioned within the viewing box. The photographic image and the viewing screen are positioned to have the light project through the rear of the image. A certain portion of the light is blocked by the linear pattern of substantially parallel lines which are printed on both the photographic image and on the viewing screen. It is desirable to increase the total lighting output of the viewing box by 50 to 100 percent for sufficient and even illumination.

By utilizing modern materials and mounting techniques, the displaying device of the present invention can maintain flatness, spacing and alignment while permitting the display to be positioned outdoors. Positioning the display device outdoors is desirable to increase the marketability of the present invention.

The semi-rigid embodiment of the present invention may be laminated on both sides with a film applied under heat and pressure to completely and permanently seal the photographic image and the viewing screen in a semi-rigid sandwich. This film which is permanently sealed may be displayed in the manner illustrated in FIGS. 4, 5, 6 or 7. This semi-rigid construction incorporates a stiffness to the various substrates thereby maintaining a weather-tight unit which is easily handled, is interchangeable, is in proper registration and provides an inexpensive system.

The technique illustrated in FIGS. 2 and 5 provides a viewing screen and a photographic image which are floating under the same tension and conditions. In this manner, the viewing screen and the photographic image will remain substantially vertical and in a substantially parallel relationship with respect to each other. Both the viewing screen and the photographic image will not be affected by irregularities in the support frame and the surfaces of the support frame, by heat whether it be expansion or contraction, or by moisture conditions. This technique should be contrasted with the rigid mounting technique illustrated in FIG. 6 wherein the viewing screen and the photographic image are positioned on a thicker base material to add extra rigidity to the unit.

By segmenting the original photograph and yet maintaining the same mathematical ratio and registration, it is possible to provide a billboard size three dimensional image as illustrated in FIGS. 7 and 8. The viewing screen and the photographic image may be properly laminated so as to provide a weatherproof unit. The billboard size three dimensional display illustrated in FIG. 7 requires mullions 318 to secure the units together. The billboard size display illustrated in FIG. 8 can incorporate invisible splicing of the modules by utilizing a clear dry mount material and clear splicer film, for example, mylar, vinyl, acetate, etc.

The method of the present invention is achieved by utilizing a camera having a lenticular taking screen of predetermined thickness. A photographic image is printed having the series of substantially parallel image segments being superimposed thereon. A film is printed which includes the plurality of parallel lines disposed thereon. The film will comprise the viewing screen in the three dimensional display. The film and the photographic image are spaced a predetermined distance therebetween. The substantially parallel lines on the film and the substantially parallel image segments on the photographic image are aligned with respect to each other. The film is maintained in a substantially parallel orientation with respect to the photographic image, thus displaying a three dimensional visual image. In this method, the same camera is utilized to produce both the film having the plurality of substantially parallel lines disposed thereon and the photographic image having the plurality of parallel image segments disposed thereon. The predetermined distance between the film and the photographic image is determined by the enlargement ratio times the thickness of the camera taking screen.

The present invention provides a multidimensional photographic display wherein the laminating of the elements are easily waterproofed for utilizing the display for outdoor advertising.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A photographic transparency display for depicting a three dimensional visual image comprising:
   supporting frame means for displaying a photographic image which defines a height, a width, a first side and a second side;
   a viewing screen extending substantially along said height and width of said first side of said supporting frame means with said viewing screen generated by exposing photographic film to light which has passed through a lenticular screen thereby generating a plurality of substantially parallel lines which are of a predetermined width and separated by clear spaces;
   a transparency having a photographic image disposed thereon and extending substantially along said height and width of said second side of said supporting frame means and spaced from said first side by a predetermined distance with said photographic image including a plurality of substantially parallel image segments generated by exposing said transparency to light which has passed through said lenticular screen, said image segments having a predetermined width corresponding to the width of said lines on said viewing screen and being in fixed alignment and registration with said lines on said viewing screen;
   wherein a three dimensional visual image of said photographic image results when viewing said photographic image through said viewing screen.

2. A photographic transparency display according to claim 1, wherein said supporting frame means includes an outer frame, a plurality of spacers and a plurality of spring members for securing said viewing screen and said photographic image on said transparency to the outer frame.

3. A photographic transparency display according to claim 2, wherein said viewing screen and said photographic image on said transparency are flexible and are held in a substantially parallel arrangement by said plurality of spacers and spring members.

4. A photographic transparency display according to claim 2, wherein said outer frame includes a plurality of pegs projecting therefrom for retaining said plurality of spring members under tension for maintaining said viewing screen and said photographic image on said transparency retained relative to each other by said plurality of spacers in a substantially parallel arrangement.

5. A photographic display according to claim 1, wherein said supporting frame means includes a rigid support frame with two slots disposed therein for retaining said viewing screen and said photographic image on said transparency in a substantially parallel arrangement.

6. A photographic transparency display according to claim 5, wherein said viewing screen and said photographic image on said transparency are semi-rigid.

7. A photographic transparency display according to claim 1, wherein said photographic image on said transparency and said viewing screen are enlarged by a predetermined factor, said lenticular screen is constructed to define a predetermined thickness and said predetermined distance is equal to said predetermined factor multiplied by said predetermined thickness.

8. A photographic transparency display according to claim 1, wherein said supporting frame means is a rigid frame.

9. A photographic transparency display according to claim 8, wherein said viewing screen and said photographic image on said transparency are rigid members.

10. A photographic transparency display according to claim 1, wherein said supporting frame means includes a rigid outer frame, at least two spacers positioned between said viewing screen and said photographic image on said transparency and a plurality of spring members for securing said spacers to said rigid outer frame while maintaining said viewing screen and said photographic image on said transparency in a substantially parallel arrangement.

11. A photographic transparency display according to claim 1, wherein said predetermined distance is an open space.

12. A photographic transparency display according to claim 11, wherein said open space is clear of any substance except ambient air.

13. A photographic transparency display according to claim 1, wherein a translucent diffuser is positioned adjacent said transparency and said transparency is interposed between said diffuser and said supporting frame means.

14. A method of displaying a three dimensional visual image comprising the steps of:
generating a viewing screen by exposing photographic film to light which has passed through a lenticular screen thereby generating a series of substantially parallel lines which are of a predetermined width and separated by clear spaces;
generating a photographic image on a transparency with said image comprising a series of substantially parallel image segments generated by exposing said transparency to light which has passed through said lenticular screen;
spacing said viewing screen from said photographic image on said transparency by a predetermined distance;
aligning said substantially parallel lines on said viewing screen with said substantially parallel image segments on said transparency; and
maintaining said viewing screen in a fixed, substantially parallel orientation with respect to said photographic image on said transparency to display said three dimensional visual image.

15. The method according to claim 14, wherein said lenticular screen has a predetermined thickness.

16. The method according to claim 15, wherein said viewing screen and said photographic image on said transparency are enlarged by a predetermined factor and said predetermined distance between said viewing screen and said photographic image on said transparency is equal to said predetermined factor multiplied by said predetermined thickness of said lenticular screen.

17. A method of displaying a three dimensional visual image comprising the steps of:
generating a first screen with a series of substantially parallel lines by exposing photographic film to light which has passed through a lenticular screen thereby generating a first series of substantially parallel lines which are of a predetermined width and separated by clear spaces;
generating a photographic image on a first transparency by exposing said transparency to light which has passed through said lenticular screen with said photographic image comprising a first series of substantially parallel image segments of a predetermined size;
enlarging said first screen by a predetermined factor to generate a viewing screen which includes a second series of substantially parallel lines which are of a width equal to said predetermined width multiplied by a predetermined factor and separated by clear spaces;
enlarging said first transparency by said predetermined factor to generate a second transparency with a photographic image comprising a second series of substantially parallel image segments which are of a size equal to said predetermined size multiplied by said predetermined factor;
spacing said viewing screen from said second transparency by a predetermined distance;
aligning said second series of substantially parallel lines on said view screen with said second series of substantially parallel image segments on said second transparency; and
maintaining said viewing screen in a fixed, substantially parallel orientation with respect to said second transparency to display said three dimensional visual image.

* * * * *